United States Patent [19]

Masuda

[11] Patent Number: 4,497,286
[45] Date of Patent: Feb. 5, 1985

[54] INTAKE SYSTEM FOR INTERNAL COMBUSTION ENGINES

[75] Inventor: Shoji Masuda, Saitama, Japan

[73] Assignee: Honda Giken Kogyo Kabushiki Kaisha, Tokyo, Japan

[21] Appl. No.: 326,745

[22] Filed: Dec. 2, 1981

[30] Foreign Application Priority Data

Dec. 13, 1980 [JP] Japan .................. 55-175256

[51] Int. Cl.³ .............................. F02B 27/00
[52] U.S. Cl. ..................... 123/52 M; 123/52 MB; 123/432; 261/44 B
[58] Field of Search ............. 123/432, 52 M, 52 MB, 123/308, 337; 181/229; 261/23 A, 18 C, 44 B

[56] References Cited

U.S. PATENT DOCUMENTS

| | | | |
|---|---|---|---|
| 2,105,780 | 1/1938 | Davis | 123/52 |
| 2,647,502 | 8/1953 | Braun | 261/23 A |
| 2,722,206 | 11/1955 | Ball | 261/23 A |
| 3,680,305 | 8/1972 | Miller | 123/337 |
| 3,814,069 | 6/1974 | Croft et al. | 123/52 M |
| 4,194,474 | 3/1980 | Endo | 123/308 |
| 4,231,329 | 11/1980 | Ishida | 123/52 MB |
| 4,231,329 | 11/1980 | Ishida | 123/52 MB |
| 4,231,339 | 11/1980 | Matsumoto et al. | 123/308 |
| 4,244,333 | 1/1980 | Matsumoto | 123/52 M |
| 4,254,746 | 3/1981 | Chiba et al. | 181/229 |
| 4,256,063 | 3/1981 | Sumiyoshi et al. | 123/52 M |
| 4,319,553 | 3/1982 | Endo | 123/308 |

FOREIGN PATENT DOCUMENTS

| | | |
|---|---|---|
| 1925290 | 3/1969 | Fed. Rep. of Germany . |
| 2249733 | 4/1974 | Fed. Rep. of Germany . |
| 2378183 | 9/1978 | France ............ 123/52 MB |
| 55-75531 | 8/1980 | Japan . |
| 56-17715 | 4/1981 | Japan . |

OTHER PUBLICATIONS

U.S. Patent Application Ser. No. 264,165, filed 5/15/81 and entitled Intake System for use in Internal Combustion Engine.
U.S. Patent Application Ser. No. 176,542, filed 8/07/80 and entitled Intake System of an Internal Combustion Engine.

Primary Examiner—Ira S. Lazarus
Assistant Examiner—R. S. Bailey
Attorney, Agent, or Firm—Lyon & Lyon

[57] ABSTRACT

An internal combustion engine intake system employing a mixture supply chamber associated with the intake passage. A control valve is disclosed as being located between the mixture supply chamber and the intake passage which is responsively controlled by vacuum within the intake passage through a diaphragm device and by throttle linkage. A resilient link is included in the linkage associated with the throttle to isolate abrupt throttle changes from the control valve. Through these controls, the mixture supply chamber is effectively regulated for employment under advantageous conditions and disablement under other specific conditions.

7 Claims, 2 Drawing Figures

INTAKE SYSTEM FOR INTERNAL COMBUSTION ENGINES

BACKGROUND OF THE INVENTION

The field of the present invention is internal combustion engine intake systems.

With the increasing concerns regarding both pollution and fuel mileage of internal combustion engines used on both automobiles and motorcycles, efforts have been undertaken and substantial advances made in the air-fuel mixture distribution devices forming the intake systems of such engines. One such advance has been the recognition of the advantages associated with particular volumetric capacities associated with the intake passage or passages of an internal combustion engine under certain conditions of operation. Charging efficiency resulting in improved output power has resulted from the use of a mixture supply chamber associated with the intake passage near the intake valve of the engine.

In spite of the observed improvement associated with the use of such mixture supply chambers, certain difficulties also appear to exist. It has been determined that engine response may be detrimentally affected by such devices at periods of abrupt change in throttle position. For example, the advantages of such chambers are not realized during acceleration. Thus, certain disadvantages have been necessarily tolerated along with the advantages of such mixture supplied chambers.

SUMMARY OF THE INVENTION

The present invention is directed to a system providing advantageous use of mixture supply chambers in association with intake passages and yet eliminating certain disadvantages associated with transitory throttle adjustments and the like. A valve is provided to control communication between the intake passage and the mixture supply chamber of such a system. Such a valve device may be advantageously controlled pursuant to more detailed aspects of the present invention by vacuum within the intake passage and/or by throttle position. Furthermore, a resilient mechanism may be employed in controlling such a valve to the mixture supply chamber by throttle position in order that the valve may be isolated from the more abrupt actions of the throttle.

In accomplishing the foregoing control, a diaphragm device is employed to position the mixture supply chamber control valve according to the level of vacuum within the intake passage. A throttle linkage having a resilient spring member is also associated with the control valve and is biased by means of a spring to a position closing off the control valve. The linkage is arranged such that with the throttle partially opened, the control valve is by and large regulated by intake passage vacuum.

Accordingly, it is an object of the present invention to provide an improved intake system for internal combustion engines employing mixture supply chambers. More particularly, the present invention is directed to a system for controlling communication with such mixture supply chambers. Other and further objects and advantages will appear hereinafter.

DETAILED DESCRIPTION OF THE PREFERRED EMBODIMENT

Figure 1:
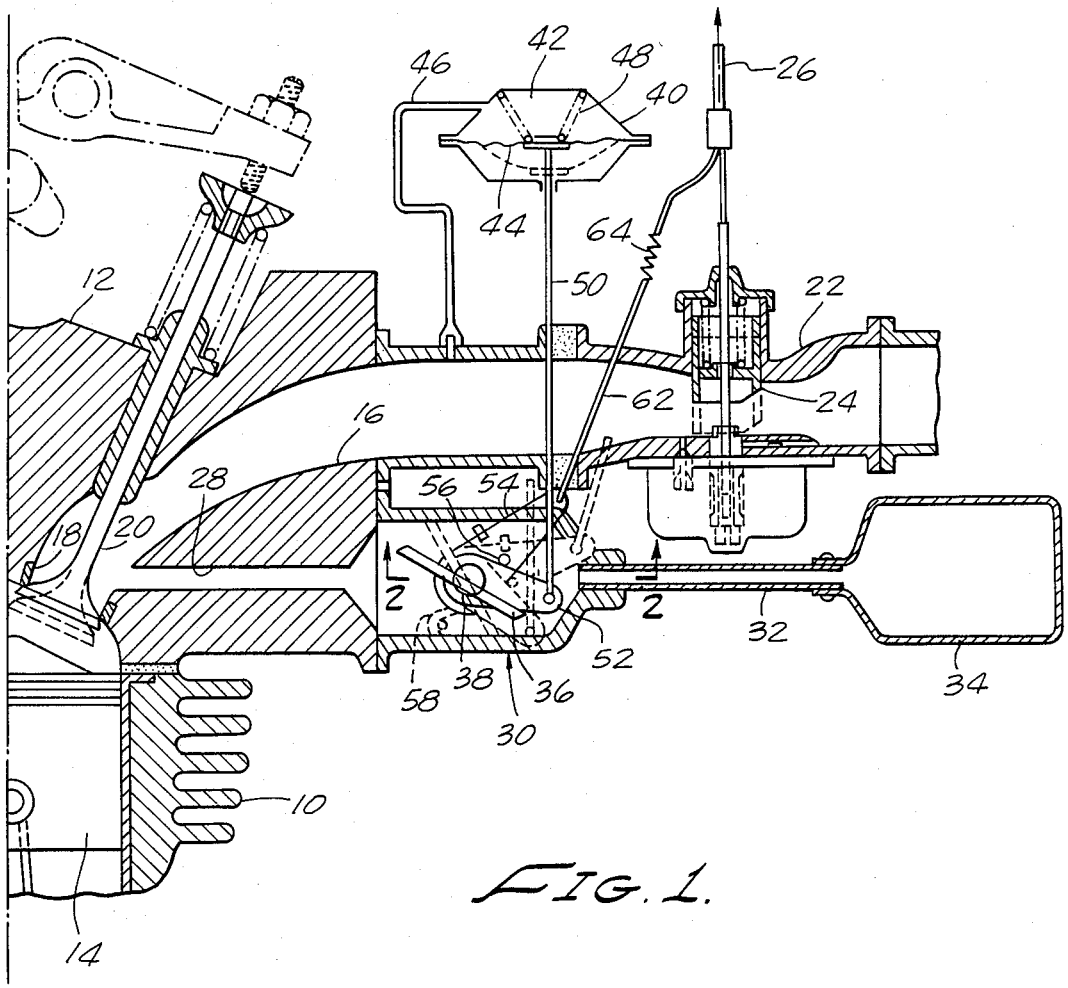
FIG. 1 is a sectional elevation diagramatically illustrating a portion of an embodiment of the present invention.

Turning in detail to the drawing, FIG. 1 illustrates an internal combustion engine having a cylinder 10, a cylinder head 12 and a piston 14. An intake passage 16 leads into the cylinder head 12 to a valved intake port 18 controlled by an intake or poppet valve 20. A throttle system 22 including a throttle valve 24 is located at the other end of the intake passage 16 and is controlled by throttle linkage 26. Thus, a substantially conventional engine is illustrated as being incorporated with the preferred embodiment. Additional conventional mechanisms associated with such an internal combustion engine (not shown) are also contemplated in the preferred embodiment.

As it approaches the valved intake port 18, the intake passage 16 is inclined with respect to the inside wall of the cylinder 10. Adjacent the valved intake port 18 and between that port and the throttle valve 24 is a passage 28. The passage 28 extends laterally from the intake passage 16 to a valve mechanism, generally designated 30. On the other side of the valve mechanism 30, an additional passage 32 extends to a mixture supply chamber 34 having a preselected volume to provide optimum charging efficiency to the intake system. Thus, the chamber 34 provides additional volumetric capacity to the intake passage 16 at an advantageous location relative to the valved intake port 18.

The valve mechanism 30, being positioned between passages 28 and 32, is located for control of communication between the chamber 34 and the intake passage 16. The valve mechanism 30 includes a control valve 36 which, in this preferred embodiment, is a butterfly valve pivotally mounted by means of a stem 38. The control valve 36 may then be rotated in cooperation with the stem 38 to cut off or allow communication between the chamber 34 and the intake passage 16.

Figure 2:
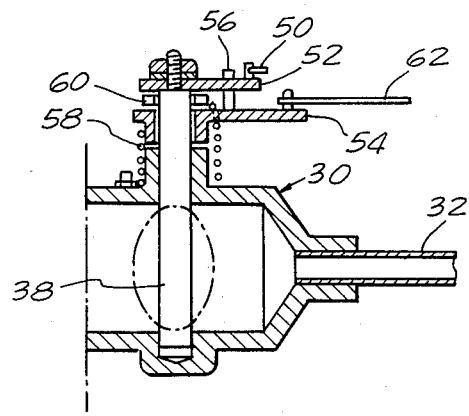
FIG. 2 is a cross-sectional view taken along line 2—2 of FIG. 1.

The stem 38 of the control valve 36 is associated with a vacuum responsive valve control means used to actuate the control valve 36. To this end, a diaphragm device 40 is employed with valve control linkage to actuate the control valve 36. The diaphragm device 40 includes a vacuum chamber 42 defined on a first side of a diaphragm 44. A vacuum line 46 communicates with the vacuum chamber 42 and with the intake passage 16 such that the vacuum within the intake passage 16 will be applied to the diaphragm 44 to draw the diaphragm upwardly as viewed in FIG. 1. A bias spring 48 acts against the vacuum in the diaphragm device 40. A control link 50 is fixed at a first end to the diaphragm 44 and extends to a valve actuating lever 52. The valve actuating lever 52 is fixed to one end of the stem 38 as can best be seen in FIG. 2 such that it is constrained to pivot therewith. Thus, increased vacuum experienced in the intake passage 16 results in a pivotal movement of the control valve 36 toward an open position allowing communication between the chamber 34 and the intake passage 16. By virtue of the bias spring 48, reduced vacuum within the intake passage 16 results in pivotal movement of the control valve 36 toward the closed position as illustrated in phantom.

A throttle responsive valve control means is also employed to control the position of the control valve 36. This mechanism includes a regulating lever 54 which is rotatably mounted about the stem 38. This lever 54 is not affixed to the stem 38 such that it would be required to rotate therewith. Rather, a stop pin 56 extends into the path of the valve actuating lever 52 on the side of the lever 52 to interfere with the opening of the control valve 36. A spring 58 biases the regulating lever 54 in a first rotational direction which will cause pin 56 to interfere with the motion of the valve actuating lever 52 and in turn the control valve 36. A washer 60 insures independent operation between the valve actuating lever 52 and the regulating lever 54. The bias spring 58 is of sufficient strength to retain the control valve 36 in the closed position regardless of the vacuum applied to the diaphragm device 40.

To lift the regulating lever 54, a second valve control linkage 62 is affixed to the throttle linkage 26 and to the regulating lever 54. With this linkage, opening of the throttle will result in the movement of the regulating lever 54 from a position of interference with the control valve 36. Such a condition is illustrated in FIG. 1 in full line. With the regulating lever 54 and the stop pin 56 rotated in cooperation with movement of the throttle linkage 26, the diaphragm device 40 is free to actuate the control valve 36 responsive to intake vacuum in intake passage 16.

Located in the second control valve linkage 62 associated with the throttle linkage 26 is a shock absorbing spring 64. The spring provides a resilient link between the throttle linkage 26 and the regulating lever 54. The resiliency in this link effects a degree of isolation of the control mechanism of the control valve 36 from abrupt changes in the throttle setting. Such an abrupt change might be experienced as the motor vehicle operator quickly accelerates.

Turning then to the operation of the system, the condition of the throttle valve 36, shown in solid lines, is indicative of a vehicle cruising under medium load. The regulating lever 54 is rotated against the bias force of the spring 58 to its position as shown. This rotation is accomplished by the overriding force of the throttle linkage 26 acting through the valve control linkage 62. Concurrently, a vacuum is present under such cruising conditions in the intake passage 16 downstream of the throttle 24. This vacuum is naturally communicated to the diaphragm device 40 which results in the rotation of the valve actuating lever 52 against the bias load of the spring 48 and into the position illustrated in solid line in FIG. 1. Under such conditions, the chamber 44 is in communication with the intake passage 16. The charging and discharging of mixture in the chamber 34 are thus normally effectively conducted by the conditions existing around the valved intake port 18.

If, under the condition of medium load discussed above, the throttle valve 24 is slowly opened to shift the running condition to a higher speed, the regulating lever 54 is responsively turned up to further remove the stop pin 56 from interference with the control valve 36. However, with the opening of the throttle valve 24, vacuum in the intake passage 16 is gradually lowered. This causes the diaphragm device 40 to move the control valve 36 through the valve control linkage toward the closed position. Thus, with reduced vacuum in the intake passage 16, the communication with the chamber 34 is throttled to restrict function of that chamber.

Again, assuming the condition of medium load discussed above, if the throttle valve 24 is abruptly opened to effect rapid acceleration for passing or other purpose, the resilient link 64 prevents an abrupt impact on the regulating lever 54. The wide-open throttle condition also acts to reduce the vacuum within the intake passage 16 resulting in the diaphragm device 40 acting to close the control valve 36. Thus, under rapid acceleration or high load, communication with the chamber 34 is shut off. The engine will then operate as one without such a mixture supply chamber. When the vacuum again intensifies within the intake passage 16, the control valve 36 is opened and the chamber 34 once again becomes effective.

Because of the overriding influence of the bias spring 58 acting both directly on the regulating lever 54 and through the stop pin 56 on the valve actuating lever 52, the control valve 36 is effectively closed when the throttle is released for either deceleration or during idle. This condition is illustrated in broken lines in FIG. 1 and is maintained regardless of the vacuum within the intake passage 16 because of the force of the spring 58. Thus, under these conditions, the chamber 34 is again inoperative.

Finally, if the engine condition is at idle and the throttle is rapidly opened, the throttle linkage 26 immediately acts on the valve control linkage 62 associated with the regulating lever 54. However, the shock absorbing spring 64 causes a short delay in the actuation of the regulating lever 54. During this delay, the vacuum in the intake passage 16 is dramatically reduced by the opening of the throttle. Therefore, the diaphragm device 40 responds by keeping the valve actuating lever 52 and in turn the control valve 36 in the closed position. Consequently, the chamber 34 remains inoperative during such rapid acceleration from idle.

Thus, as has been discussed above, the employment of a control valve between the mixture supply chamber and the intake passage allows for disablement of the chamber during certain conditions when the chamber is less advantageous. As shown, throttle settings as well as vacuum within the intake passage can be employed in regulating this chamber. Furthermore, with the employment of the resilient member in certain of the linkage, instantaneous improper responses can also be avoided. Naturally, other linkage arrangements may be employed to effect similar results. While embodiments and applications of this invention have been shown and described, it would be apparent to those skilled in the art that many more modifications are possible without departing from the inventive concepts herein. The invention, therefore, is not to be restricted except by the import of the appended claims.

What is claimed is:

1. An intake system for an internal combustion engine having a valved intake port, comprising an intake passage extending to the valved intake port of the engine, a throttle valve disposed in said intake passage, a chamber with only one opening in communication with said intake passage between said throttle valve and the valved intake port, a control valve between said chamber opening and said intake passage to control all communication therebetween, and vacuum responsive valve control means for actuating said control valve responsive to vacuum in said intake passage to open said control valve responsive to increased intake passage vacuum and to close said control valve responsive to decreased intake passage vacuum and for overriding said intake passage vacuum to close said control valve with closure of said throttle.

2. The intake system of claim 1 wherein said vacuum responsive valve control means includes a diaphragm device, one side of said diaphragm device being in communication with said intake passage, and valve control linkage extending between said diaphragm device and said control valve, said valve control linkage being constructed and arranged to open said control valve with increased vacuum in said intake passage.

3. An intake system for an internal combustion engine having a valved intake port, including an intake passage extending to the valved intake port of the engine, a throttle valve disposed in said passage, a chamber with only one opening and a chamber passage extending between said chamber opening and said intake passage intersecting said intake passage between said throttle valve and the valve intake port, wherein the improvement comprises a control valve in said chamber passage between said chamber opening and said intake passage to control all communications therebetween and means for actuating said control valve to open said control valve responsive to increased intake passage vacuum and to close said control valve responsive to decreased intake passage vacuum and for overriding said intake passage vacuum to close said control valve with closure of said throttle.

4. An intake system for an internal combustion engine having a valved intake port, comprising in combination an intake passage extending to the valved intake port of the engine, a throttle valve disposed in said intake passage, a chamber with only one opening in communication with said intake port, a control valve between said chamber opening and said intake passage to control all communication therebetween and means for actuating said control valve to open said control valve responsive to increased intake passage vacuum and to close said control valve responsive to decreased intake passage vacuum and for overriding said intake passage vacuum to close said control valve with closure of said throttle.

5. An intake system for an internal combustion engine having a valved intake port, comprising an intake passage extending to the valved intake port of the engine, a throttle valve disposed in said intake passage, a chamber with only one opening in communication with said intake passage between said throttle valve and the valved intake port, a control valve between said chamber opening and said intake passage to control all communication therebetween, and throttle responsive valve control means for limiting actuation of said control valve responsive to engine throttle position and including a resilient link constructed and arranged to isolate abrupt actions of the throttle from said control valve.

6. An intake system for an internal combustion engine having a valved intake port, comprising an intake passage extending to the valved intake port of the engine, a throttle valve disposed in said intake passage and throttle linkage thereto, a chamber with only one opening in communication with said intake passage between said throttle valve and the valved intake port, a control valve between said chamber opening and said intake passage to control all communication therebetween, vacuum responsive valve control means for actuating said control valve responsive to vacuum in said intake passage, and throttle responsive valve control means for limiting actuation of said control valve responsive to position of said throttle linkage, said vacuum responsive valve control means opening said control valve responsive to increased intake passage vacuum and to close said control valve responsive to decreased intake passage vacuum and said throttle responsive valve control means overriding said intake passage vacuum to close said control valve with closure of said throttle.

7. An intake system for an internal combustion engine having a valved intake port, comprising an intake passage extending to the valved intake port of the engine, a throttle valve disposed in said intake passage and throttle linkage thereto, a chamber with only one opening in communication with said intake passage between said throttle valve and the valved intake port, a control valve between said chamber opening and said intake passage to control all communication therebetween, a diaphragm device, one side of said diaphragm device being in communication with said intake passage, a first valve control linkage extending between said diaphragm device and said control valve, said first valve control linkage being constructed and arranged to open said control valve with increased vacuum, a second valve control linkage extending from said throttle linkage to said control valve, a stop pin on said second valve control linkage positioned and arranged to selectively interfere with movement of said control valve, a spring coupled to said second valve control linkage to bias said second linkage and said stop pin in a first direction into interference with said control valve, and a resilient link in said second valve control linkage constructed and arranged to isolate abrupt actions of said throttle linkage from said control valve.

* * * * *